*INVENTOR.*
GEORGE F. WILLIAMS
HOEL L. BOWDITCH
BY Lawrence H. Poston
AGENT

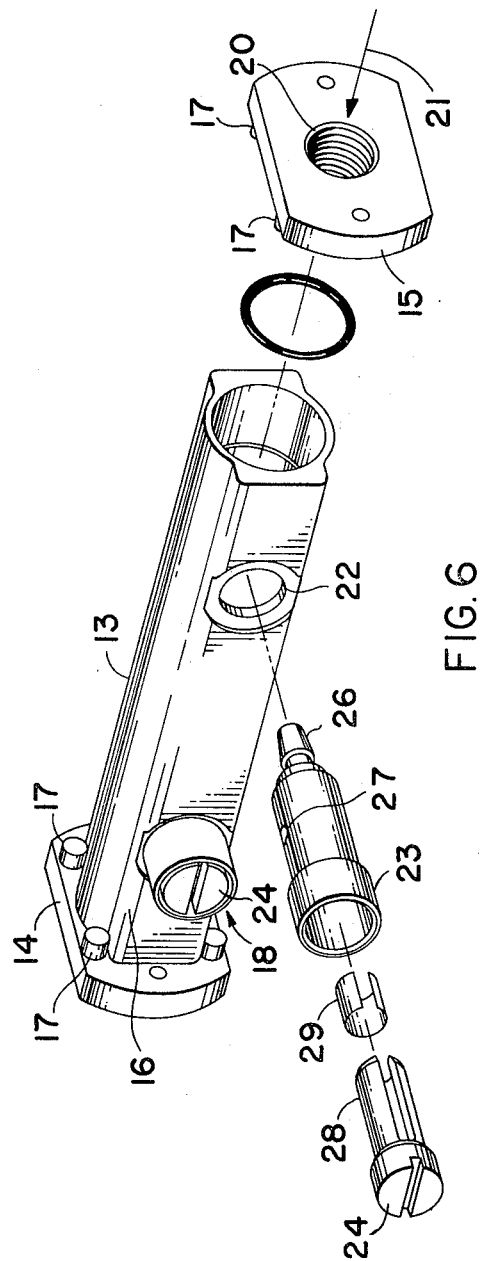

United States Patent Office 3,499,464
Patented Mar. 10, 1970

3,499,464
FLUID SUPPLY MANIFOLD SYSTEM FOR FLUID OPERATED INSTRUMENTATION
George F. Williams, Riverside, R.I., and Hoel L. Bowditch, Foxboro, Mass., assignors to The Foxboro Company, Foxboro, Mass., a corporation of Massachusetts
Filed July 15, 1968, Ser. No. 744,834
Int. Cl. F17d 1/00
U.S. Cl. 137—608                     5 Claims

ABSTRACT OF THE DISCLOSURE

A manifold system for distributing operating fluid from a fluid source to various areas of control and/or energy instrumentation. The system is provided with individual flow to several special valves within the manifold.

---

This invention relates to fluid systems in and for the operation of instrumentation for process and energy control. It relates more particularly to a mainfold system in a fluid supply to such a system.

In fluid instrumentation there are many points of need for a source of instrument power fluid. The fluid is usually air. Such sources are provided with fluid forces and the volumes to readily supply any one or simultaneously all of the needs of the particular instrumentation system. These sources may provide operating forces such as used to operate flow valves for example, or to provide the small pilot flows through nozzle-baffle situations, or combinations of like nature. In fluid logic systems, these sources may supply power and/or signal forces. Many of such power fluid sources provide continuous flows through dynamic systems, or to closed ended systems such as bellows or diaphragm operated switches, transfer units or the like.

In the intricacies of modern fluid operated instrumentation where there may be a number of fluid power or control input needs for a single control or energy installation. These needs may vary from large to small, and the needs may vary in application, some needed now, some then, or in different combinations for different installations.

Accordingly, a single fluid source may be provided, and applied to the particular instrumentation through a manifold.

In this invention, the manifold is provided with means for selecting and directing fluid from the source to the various needs of the installation.

The manifold of this invention is provided with two or more special valves, in a system wherein each valve has direct and open connection from the source, valves being individually operable, means provided for positive assembly of the manifold to precisely align the outputs of the valves in the manifold with the receptor passages or flow lines therefor in the instrumentation, and valve assemblies within the manifold, specially formed for simple, dependable, fluid tight positive individual line valving action.

Other objects and advantages will be in part apparent and in part pointed out hereinafter and in the accompanying drawings, wherein:

FIGURE 6 is a perspective, partially exploded view of the manifold system of FIGURES 1, 2, and 3.

In the drawings, all figures are illustrations with respect to the same manifold system and structure, and like reference numbers are applied to like elements throughout the drawings.

Figure 1:
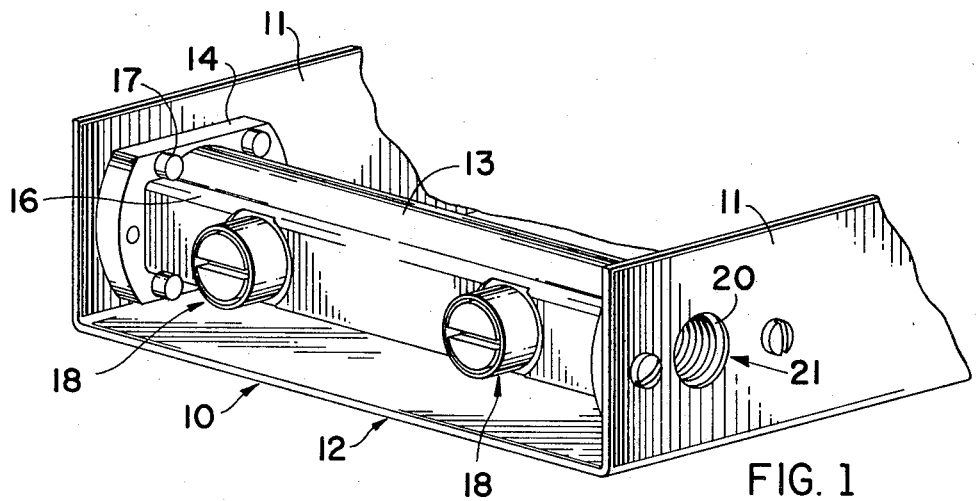
FIGURE 1 is an illustration of a manifold system according to this invention, as mounted in an instrument housing.
Figure 2:
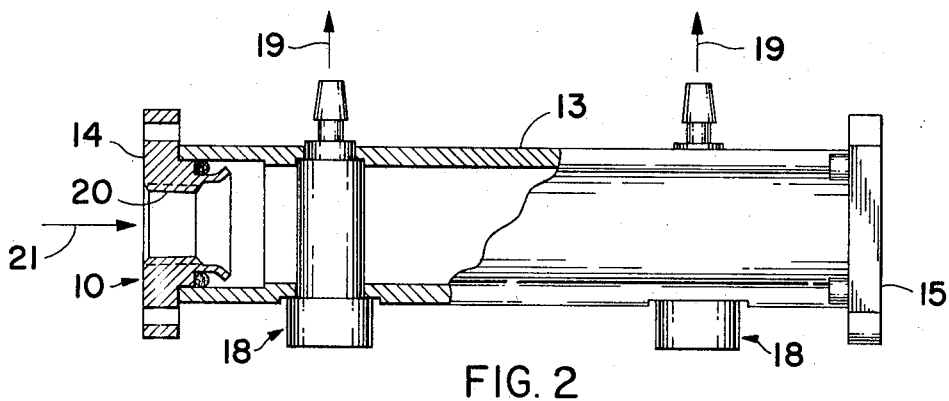
FIGURE 2 is a central lengthwise section fragment showing of the manifold of FIGURE 1.
Figure 7:
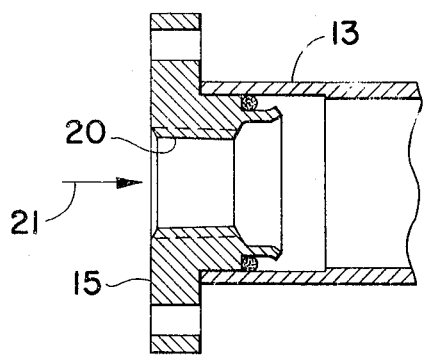
FIGURE 7 is a central section through an end cap and end portion for and of the manifold of FIGURES 1 and 5.

In FIGURE 1, a tubular manifold housing 10 is shown end mounted between vertical side walls 11 of an instrumentation tray 12, ordinarily at the rear of such a tray. The housing 10 comprises a tubular body 13, with end caps 14 and 15. The end caps are mounted on the side walls 11 of the tray 12 and the caps have O rings sealed extensions extending into and closely fitting within the ends of the housing tube, see FIGURES 6 and 7. The housing tube 10 is provided with external lengthwise shoulders 16 and the end caps are provided with locating bosses 17 which engage the shoulders 16, FIGURE 6, to locate the housing 10 rotationally about its lengthwise axis to properly align valve assemblies 18 with whatever instrument units or connections (not shown) are to be used. The outlet directions of the valve assemblies are indicated by arrows 19, FIGURES 1, 2, and 5. The end cap 14 is a dead end for the tube 13, and the end cap 15 has an opening 20 therethrough as the air supply entrance to the system indicated by arrow 21.

As seen in the various figures, the tubular housing 13 has the valve assemblies 18 mounted therein and transversely therethrough. For simplicity, only two valve assemblies are shown, but any number may be used according to the practical and desired limits of air supply and instrument application.

Figure 3:
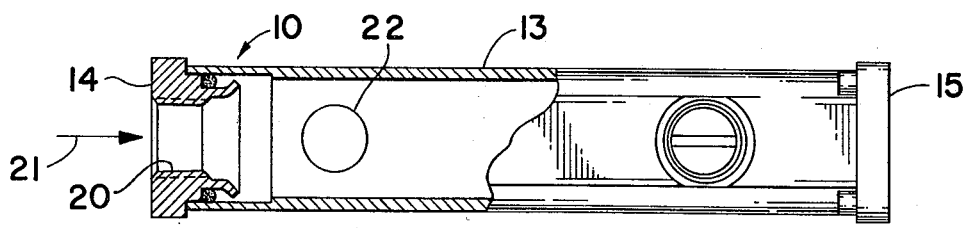
FIGURE 3 is a further lengthwise section of the manifold of FIGURE 1, without the valve assemblies and at 90 degree rotation with respect to the section of FIGURE 2.
Figure 4:
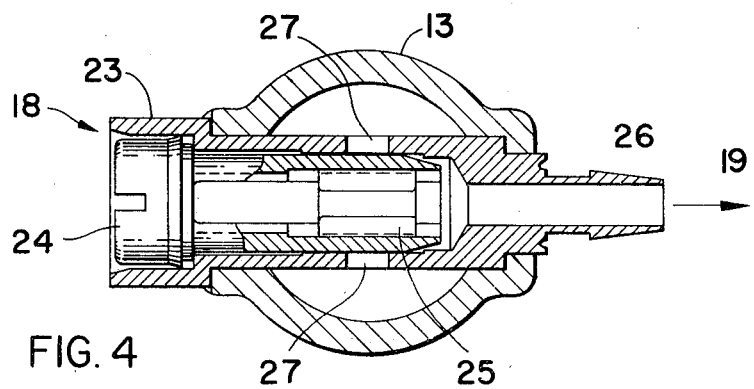
FIGURE 4 is a central lengthwise section through either of the valve assemblies of FIGURE 2.

In the FIGURE 3 view of the housing 13 without the valve assemblies, as well as in FIGURES 4 and 6, it may be seen that side wall, opposite and aligned openings 22 are provided in the housing 13 for mounting the valve assemblies 18 within and transversely of the housing 13 in fluid tight relation therewith except for the intended fluid passages from the interior of the housing 13 into the interior of the valve assemblies.

As shown in FIGURES 3 and 4 there is direct an unobstructed fluid flow space above and below each of the valve assemblies, within the housing 13, to provide individual fluid flow from the input at 21 to each of the valve assemblies without obstruction or interference by any other of the valve assemblies. Each valve assembly has its output extending out beyond the housing on the one side thereof, and its operation end open and accessible outside the housing on the other side thereof.

Figure 5:
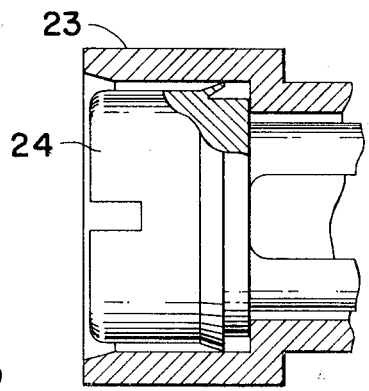
FIGURE 5 is an enlargement of a fragment of the valve stem head portion of FIGURE 4.

The detail of the valve assemblies 18 are shown in FIGURES 4 and 5, and as exploded, in FIGURE 6. Each valve assembly comprises an outer valve sleeve 23, a valve stem 24, and a valve spring unit 25.

As in FIGURE 4 the valve sleeve 23 has two peripherally outer shoulder portions, one abutting on an outer face of the manifold tube 13 and the other abutting on an inner face thereof, with portions adjacent to the shoulder portions within the valve assembly openings in the manifold tube 13, in close fitting fluid-tight relation therewith. The valve sleeve 23 extends outward beyond the manifold tube on both ends of the sleeve. On the left in the drawing the sleeve provides a shouldered opening for receiving the valve stem 24, and on the right in the drawing the sleeve provides a coupling extension 26 outside of the manifold tube for receiving an output tube or connection (not shown) for the output indicated by the arrow 19. The valve sleeve is staked on this output to sufficiently spread the sleeve wall to bind the sleeve into the manifold tube opening and to firmly seat the valve sleeve throughout to provide fluid-tight assembly between the valve sleeve and the manifold tube in their mutual mounting relation.

The valve sleeve 23 has side wall openings 27 for fluid communication between the interior of the manifold tube and the interior of the valve sleeve, and the inner wall of the valve sleeve is provided with valve stem seating surface about the openings 27, and valve stem clearance elsewhere.

The valve stem 24 has a screw head seated within the shouldered opening of the valve sleeve, with a skirted periphery as in FIGURE 5 such that fluid pressure under the skirt from within the sleeve results in a tighter fit of the valve stem head within the shoulder opening of the sleeve.

The main body of the valve stem 24 is in the form of a simple two-legged clothes pin, with the legs 28 each being formed as parts of a cylindrical sleeve. The valve stem material is flexible, preferably of plastic, and in closed position, the valve stem legs seal off the valve sleeve openings 27, when the valve stem is rotated, the lengthwise slots in the stem are registered with the openings 27 to provide fluid communication into and through the valve assembly.

Within the cylindrical form defined by the valve stem legs the split cylindrical spring sleeve 25 is provided for biasing the flexible valve stem legs radially outward to seat against the inner wall of the valve sleeve. This spring is held in place by its own spring effect against the inside walls of the valve stem legs end clearance within the valve stem makes it possible for the spring to be placed rotationally or axially for seating to best effect.

The lengthwise spring slot provided by its split formation will normally be registered with one of the slots between the valve stem legs so that normal fluid communication is from the manifold tube to the interior of the spring and then lengthwise to the output indicated by arrow 19.

This invention therefore provides a new and useful fluid source manifold system with direct flow to individual valves, and valve assemblies within the manifold while yet providing valve operating access from the outside.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

We claim:
1. For use in fluid systems in the operation of process and energy control instrumentation, wherein operating fluids are required as power and/or signal means at different points or in different areas of such instrumentation, means for selectively providing said operating fluids to such places for such purposes;

said means comprising a fluid supply manifold system of fluid passages and valves wherein direct fluid passage is permanently open individually to each of said valves from a fluid source input;

said fluid supply manifold system comprising a tubular housing, closed except for a fluid supply inlet opening and mounting openings for at least two valve assemblies through each of which assemblies fluid may be provided with passage from inside said tubular housing to said instrumentation, means for directing fluid into said housing from a fluid source, valve assemblies sealed in said valve mounting openings with said valve assemblies essentially entirely contained in said housing and mounted transversely thereof, with said tubular housing of sufficient cross-section form and dimension to provide direct unobstructed fluid passage the full length of said housing past said valve assemblies, with each of said valve assemblies extending out from one side of said housing as a valve output and exposed to access from the other side of said housing for means for operating the valve;

each of said valve assemblies comprising, an outer cylindrical housing sleeve mounted in said tubular manifold housing, transversely thereof with end portion of said sleeve fluid-tight mounted in opposite walls of said housing and extending outside of said housing at both said sleeve ends, side wall openings in said sleeve within said housing to provide the only fluid passage connection between the interior of said housing and the interior of said sleeve, a screw-slot headed flexible plastic clothes-pin valve stem in sleeve form mounted in said valve housing for rotation therewith to move the clothespin stem slots into and out of register with said side wall openings in said valve sleeve, and a cylindrical split-sleeve spring located within said clothespin sleeve stem in transversely outwardly biasing relation therewith to seat the legs of said clothespin stem against the inner wall of said valve sleeve to seal off said valve sleeve openings except when the clothespin stem slots are in register with said valve sleeve openings, said split-sleeve spring being held axially within said valve stem only by its own spring bias, whereby individual valve assemblies may be opened by rotating said valve stem screw-slot head, and closed by further such rotation.

2. A fluid supply manifold system according to claim 1 wherein said screw-slot head of said clothes-pin stem is provided with a peripheral, integral and flexible skirt, angled towards the interior of the housing whereby fluid pressure between the stem head and said skirt results in fluid-tight fit between said skirt and said valve housing sleeve.

3. A fluid manifold system according to claim 1 or 2 wherein said split-sleeve spring has end clearance for possible axial movement while maintaining fully effective the bias action thereof in closing said openings in said housing sleeve through pressure against said clothes-pin legs, said spring being free for both axial and rotary location within said valve under the restraining effect of its own spring bias condition.

4. A fluid manifold system according to claim 1 wherein said tubular housing is provided with end assembly means with respect to mounting means for said housing, said mounting means including alignment means for assuring suitable and precise positioning of the output ends of said valve assemblies, with respect to positions of rotation about the lengthwise axis of said housing.

5. A fluid manifold system according to claim 1 wherein said mounting means comprises end caps for said housing with bosses on said end caps for locationally engaging outer lengthwise shoulders on said tubular housing.

References Cited

UNITED STATES PATENTS

| | | | |
|---|---|---|---|
| 1,265,953 | 5/1918 | Pittman | 137—608 XR |
| 1,775,980 | 9/1930 | Walbridge | 137—608 XR |
| 2,075,459 | 3/1937 | Parker | 251—182 |
| 2,566,071 | 8/1951 | Schobert | 251—182 |
| 2,575,240 | 11/1951 | Thompson | 137—608 |
| 2,707,092 | 4/1955 | Bowditch | 251—182 |
| 3,039,489 | 6/1962 | Botkin | 137—608 |
| 3,092,141 | 6/1963 | Stark | 137—608 |
| 3,407,842 | 10/1968 | Zahuranec | 137—608 XR |

SAMUEL SCOTT, Primary Examiner

U.S. Cl. X.R.

251—182